No. 889,962. PATENTED JUNE 9, 1908.
G. PESCHEL.
BAKER'S KNEADING TROUGH.
APPLICATION FILED AUG. 30, 1906.
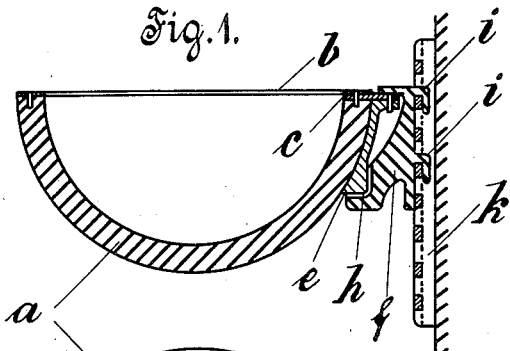
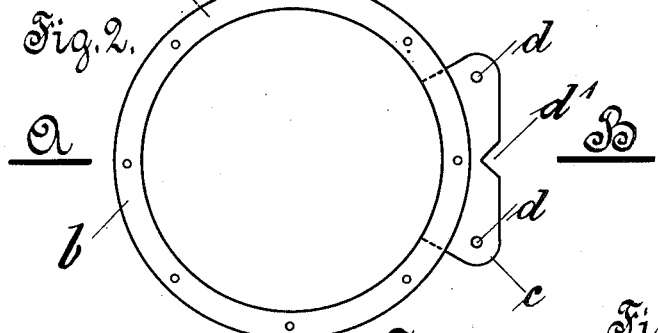
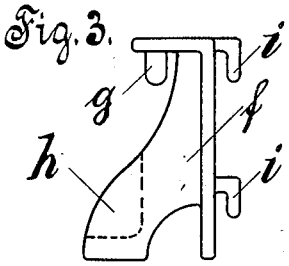
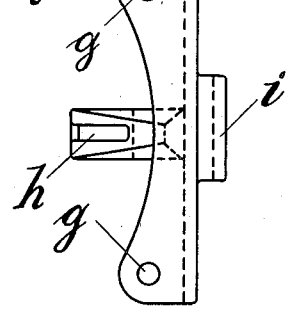
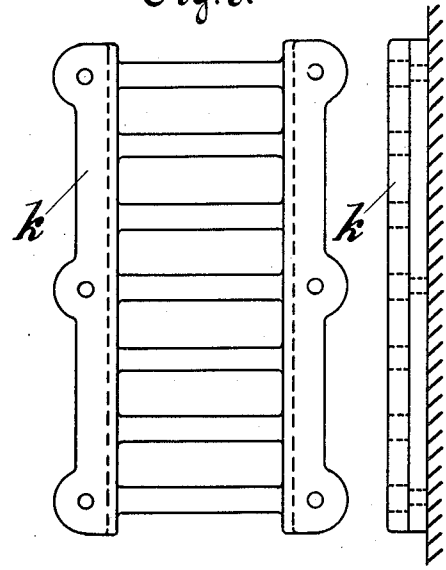
Witnesses
Inventor
Gustav Peschel

UNITED STATES PATENT OFFICE.

GUSTAV PESCHEL, OF STETTIN, GERMANY.

BAKER'S KNEADING-TROUGH.

No. 889,962.

Specification of Letters Patent.

Patented June 9, 1908.

Application filed August 30, 1906. Serial No. 332,592.

*To all whom it may concern:*

Be it known that I, GUSTAV PESCHEL, a subject of the Emperor of Germany, residing at No. 16 Friedrich Carlstrasse, Stettin, in the State of Prussia, Germany, have invented a new and useful Improvement in Bakers' Kneading - Troughs, of which the following is a specification.

This invention relates to an improved baker's kneading trough. This trough is attachable to the wall by means of a frame, is easily removed and is adjustable as to height. Moreover it possesses over the previously used kneading troughs the advantage that during kneading or working of the dough it stands perfectly firm.

A further advantage consists in the method of fastening, which enables the trough to be adjusted at any height convenient for the person using it.

The invention is illustrated in the accompanying drawing as follows: Figure 1 shows a section through the trough and the supporting device on the line A—B of Fig. 2. Fig. 2 shows a view from above of the trough and support. Fig. 3 is a side elevation of the support. Fig. 4 a view from above of the same. Figs. 5 and 6 show the fixed supporting rack in front and side elevation respectively.

In these drawings, $a$ indicates a trough of the construction usual for the use of bakers and confectioners, and having on it a supporting frame $b$, which is provided at one side with a projection $c$. This projection has two holes $d$ and is provided with a triangular guide slot $d'$ as well as with a heel piece $e$. The holder $f$ has upon it two studs $g$.

The letter $h$ indicates a slot and $i$ two hook - shaped projections bent at a right angle. The fixed rack $k$ is provided with screw holes, whereby it can be fastened to the wall. When the apparatus is to be brought into use the hooks $i$ are hung upon the bars of the rack $k$ at a height convenient for the person about to use the kneading trough. The kneading trough is then taken and its projection $c$ is brought under the studs $g$ of the holding device so that the holes $d$ receive the studs $g$ and the heel piece $e$ fits into the cavity $h$ of the holder. As may be seen in Fig. 1 the fall of the trough downwards is impossible because the part $e$ has a sufficient support.

By means of this device the advantage is obtained that the hitherto unavoidable turning and rocking of the kneading trough during the operation of kneading is prevented, and this economizes the labor of the kneader because his efforts are required solely for the working of the dough, whereas in the previously constructed apparatuses they were partly required for the holding firm of the kneading trough.

What I claim is:

1. In combination, a baker's kneading trough, a supporting piece on said trough, a heel piece on said supporting piece, a holder adapted to engage above in the said supporting piece, and below with said heel piece, a fixed rack, and a plurality of hooks on said holder adapted to engage with the fixed rack.

2. In combination, the baker's kneading trough $a$, the supporting frame $b$ fixed upon said trough, the slotted and holed projection $c$ on said frame, the heel piece $e$ on said frame, the holder $f$ recessed at $h$ to receive the heel piece $e$, the studs $g$ on said holder adapted to engage in the holes of the frame $b$, the fixed rack $k$, and the hooks $i$ on the holder $f$ adapted to engage at the desired height with the rungs of the said rack $k$.

In testimony whereof I have signed my name to this specification in the presence of two subscribing witnesses.

GUSTAV PESCHEL.

Witnesses:
 KASIMIR GRECLASHAWS,
 ROBERT NITZ.